(12) United States Patent
Sugimoto

(10) Patent No.: US 9,469,268 B2
(45) Date of Patent: Oct. 18, 2016

(54) AIR-BAG DEVICE

(71) Applicant: Shinichi Sugimoto, Tokyo (JP)

(72) Inventor: Shinichi Sugimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/721,056

(22) Filed: May 26, 2015

(65) Prior Publication Data
US 2015/0343985 A1 Dec. 3, 2015

(30) Foreign Application Priority Data

Jun. 3, 2014 (JP) ................................. 2014-115194
Jun. 13, 2014 (JP) ................................. 2014-122727

(51) Int. Cl.
*B60R 21/231* (2011.01)
*B60R 21/207* (2006.01)
*B60R 21/233* (2006.01)
*B60R 21/237* (2006.01)

(52) U.S. Cl.
CPC ....... *B60R 21/23138* (2013.01); *B60R 21/207* (2013.01); *B60R 21/237* (2013.01); *B60R 2021/23146* (2013.01); *B60R 2021/23161* (2013.01); *B60R 2021/23316* (2013.01)

(58) Field of Classification Search
CPC .......... B60R 21/207; B60R 21/23138; B60R 2021/23146; B60R 2021/23161; B60R 2021/23316
See application file for complete search history.

(56) References Cited

U.S. PATENT DOCUMENTS

| 6,886,857 | B1 * | 5/2005 | Mishina | ............... | B60R 21/2342 |
| | | | | | 280/739 |
| 7,637,530 | B2 * | 12/2009 | Yamaji | ............... | B60R 21/23138 |
| | | | | | 280/730.2 |
| 7,735,858 | B2 * | 6/2010 | Megiveron | ......... | B60R 21/0136 |
| | | | | | 280/730.2 |
| 7,971,901 | B2 | 7/2011 | Tomitaka et al. | | |
| 8,210,566 | B2 | 7/2012 | Fukawatase et al. | | |
| 8,246,076 | B2 * | 8/2012 | Schmidt | ............ | B60R 21/23138 |
| | | | | | 280/730.1 |
| 8,267,424 | B2 | 9/2012 | Tomitaka et al. | | |
| 9,290,151 | B2 * | 3/2016 | Fujiwara | ................ | B60R 21/231 |
| 2006/0001244 | A1* | 1/2006 | Taguchi | ............ | B60R 21/23138 |
| | | | | | 280/729 |
| 2006/0131847 | A1* | 6/2006 | Sato | ....................... | B60R 21/207 |
| | | | | | 280/730.2 |
| 2006/0267318 | A1* | 11/2006 | Nishikaji | .......... | B60R 21/23138 |
| | | | | | 280/730.2 |
| 2009/0243268 | A1 | 10/2009 | Suzuki et al. | | |
| 2010/0181749 | A1 | 7/2010 | Sugimoto | | |
| 2010/0295280 | A1 | 11/2010 | Tomitaka et al. | | |
| 2012/0049498 | A1* | 3/2012 | Wiik | ................. | B60R 21/23138 |
| | | | | | 280/743.2 |
| 2012/0091697 | A1* | 4/2012 | Wiik | ................. | B60R 21/23138 |
| | | | | | 280/730.2 |
| 2012/0248746 | A1 | 10/2012 | Yamamoto | | |
| 2014/0097601 | A1 | 4/2014 | Fukawatase et al. | | |
| 2015/0115576 | A1* | 4/2015 | Acker | .................. | B60R 21/207 |
| | | | | | 280/728.2 |

(Continued)

FOREIGN PATENT DOCUMENTS

DE    EP 0847902 A1 * 6/1998    ....... B60R 21/23138
DE    102012008391    10/2013
EP    1442946    8/2004

(Continued)

*Primary Examiner* — Ruth Ilan
(74) *Attorney, Agent, or Firm* — IPUSA, PLLC

(57) ABSTRACT

An air-bag device includes an air bag stored in an inner side of a backrest in a vehicle width direction, and an inflator that inflates and expands the air bag. The air bag includes a first chamber that houses the inflator such that the longitudinal direction of the inflator matches the vertical direction of the air bag, and a second chamber that is located above the first chamber and is inflated and expanded by a gas ejected from an upper end of the inflator to form a tubular shape extending upward above the first chamber.

9 Claims, 6 Drawing Sheets

(56) References Cited

U.S. PATENT DOCUMENTS

| | | | |
|---|---|---|---|
| 2015/0314748 A1* | 11/2015 | Mihm | B60R 21/2338 280/730.2 |
| 2016/0129876 A1* | 5/2016 | Fujiwara | B60R 21/233 280/729 |

FOREIGN PATENT DOCUMENTS

| | | | | |
|---|---|---|---|---|
| EP | 2050630 | 4/2009 | | |
| FR | WO 2010086124 A1 * | 8/2010 | | B60R 21/207 |
| JP | 2009-67330 | 4/2009 | | |
| JP | 2009-67331 | 4/2009 | | |
| JP | 2009-234538 | 10/2009 | | |
| JP | 2010-163142 | 7/2010 | | |
| JP | 4894803 | 3/2012 | | |
| JP | 2012-081958 | 4/2012 | | |
| JP | 5024248 | 9/2012 | | |
| JP | 5177220 | 4/2013 | | |
| JP | 5382584 | 1/2014 | | |
| JP | 5382585 | 1/2014 | | |
| SE | GB 2299061 A | * | 9/1996 | B60R 21/23138 |
| SE | GB 2318767 A | * | 5/1998 | B60R 21/23138 |

* cited by examiner

AIR-BAG DEVICE

CROSS-REFERENCE TO RELATED APPLICATIONS

The present application is based upon and claims the benefit of priority of Japanese Patent Application No. 2014-115194 filed on Jun. 3, 2014 and Japanese Patent Application No. 2014-122727 filed on Jun. 13, 2014, the entire contents of which are incorporated herein by reference.

BACKGROUND OF THE INVENTION

1. Field of the Invention

An aspect of this disclosure relates to an air-bag device.

2. Description of the Related Art

Japanese Laid-Open Patent Publication No. 2010-070003, for example, discloses an air-bag device including an air bag that comes out of a backrest of a seat and supports a passenger who is relatively displaced by an inertial force toward a body side (impact side) of a vehicle that has been hit by an impact in the vehicle width direction. The disclosed air-bag device includes an air bag that is stored in an outer side of the backrest in the vehicle width direction and receives a passenger sitting in a seat closer to the impact side, and an air bag that is stored in an inner side of the backrest in the vehicle width direction and receives a passenger sitting in a seat further from the impact side.

When the air bag stored in the outer side of the backrest in the vehicle width direction is expanded, the expanded air bag is pressed toward the impact side by the upper body of a passenger displaced toward the impact side. However, even when pressed toward the impact side, the expanded air bag is supported by the body side of the vehicle and does not easily collapse (or bend) toward the impact side.

On the other hand, in the case of the air bag stored in the inner side of the backrest in the vehicle width direction, there exists no part, between the backrest and an adjacent seat, which entirely supports the air bag when it is expanded. Therefore, the expanded air bag on the inner side of the backrest easily collapses (or bends) toward the impact side when pressed by the upper body of a passenger displaced toward the impact side.

SUMMARY OF THE INVENTION

In an aspect of this disclosure, there is provided an air-bag device including an air bag stored in an inner side of a backrest in a vehicle width direction, and an inflator that inflates and expands the air bag. The air bag includes a first chamber that houses the inflator such that the longitudinal direction of the inflator matches the vertical direction of the air bag, and a second chamber that is located above the first chamber and is inflated and expanded by a gas ejected from an upper end of the inflator to form a tubular shape extending upward above the first chamber.

DESCRIPTION OF THE PREFERRED EMBODIMENTS

Embodiments of the present invention are described below with reference to the accompanying drawings.

Figure 1:
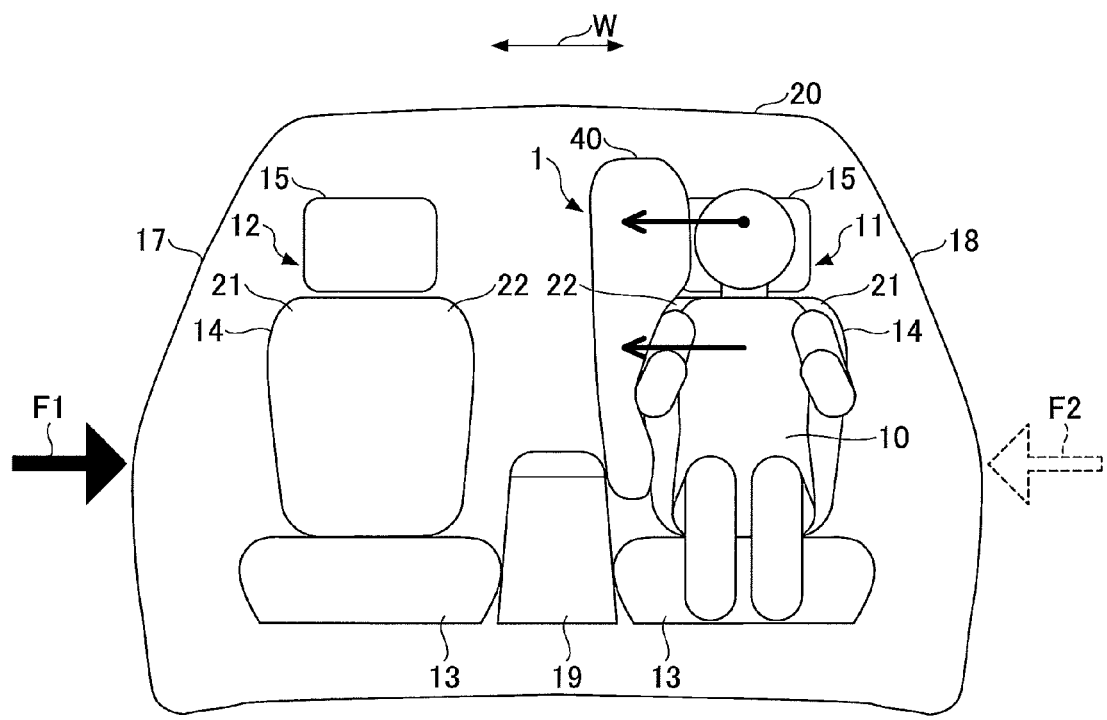
FIG. 1 is a front view where an air bag stored in an inner side of a backrest in a vehicle width direction is inflated and expanded.

FIG. 1 is a transparent front view of a vehicle 20 where an air bag 40 is inflated and expanded. In the vehicle 20, adjacent seats 11 and 12 are arranged in a width direction (vehicle width direction W) of the vehicle 20. For example, one of the seats 11 and 12 is a driver seat and the other one of the seats 11 and 12 is a passenger seat. In the example of FIG. 1, a passenger 10 sits in the seat 11.

A center console 19 is disposed between the seat 11 and the seat 12. The center console 19 includes, for example, an operations unit such as operation switches and a storage such as a cup holder.

Each of the seats 11 and 12 includes a bottom 13 on which a hip of a person is placed, a backrest 14 that extends upward from the rear end of the bottom 13 facing the rear side of the vehicle 20, and a headrest on the top of the backrest 14. The backrest 14 supports the back of a person.

The backrest 14 includes an outer side 21 that is in an outer position (or faces outward) in the vehicle width direction W and an inner side 22 that is in an inner position (or faces inward) in the vehicle width direction W. An air-bag device 1 of the present embodiment is a passenger protection device including the air bag 40 that is stored in the inner side 22 of the backrest 14 while being in a non-inflated state, i.e., before being inflated and expanded.

When, for example, an impact F1 applied to a body side 17 of the vehicle 20 from one side of the vehicle width direction W is detected, the air-bag device 1 inflates and expands the air bag 40 disposed at the inner side 22 of the seat 11 located further from the body side 17. With this configuration, even when the upper body of the passenger 10 sitting in the seat 11 is displaced by an inertial force toward the body side 17, the upper body of the passenger 10 can be supported by the air bag 40 that is inflated and expanded toward a side surface of and a space above the center console 19.

In the example of FIG. 1, the air-bag device 1 is stored in the inner side 22 of the backrest 14 of the seat 11. However, the air-bag device 1 may also be stored in the inner side 22 of the backrest 12 of the seat 12. When, for example, an impact F2 applied to a body side 18 of the vehicle 20 from another side of the vehicle width direction W is detected, the air-bag device 1 in the seat 12 inflates and expands the air bag 40 disposed at the inner side 22 of the seat 12 located further from the body side 18. With this configuration, even when the upper body of a passenger sitting in the seat 12 is displaced by an inertial force toward the body side 18, the upper body of the passenger can be supported by the air bag 40 that is inflated and expanded toward a side surface of and above the center console 19.

Figure 2:
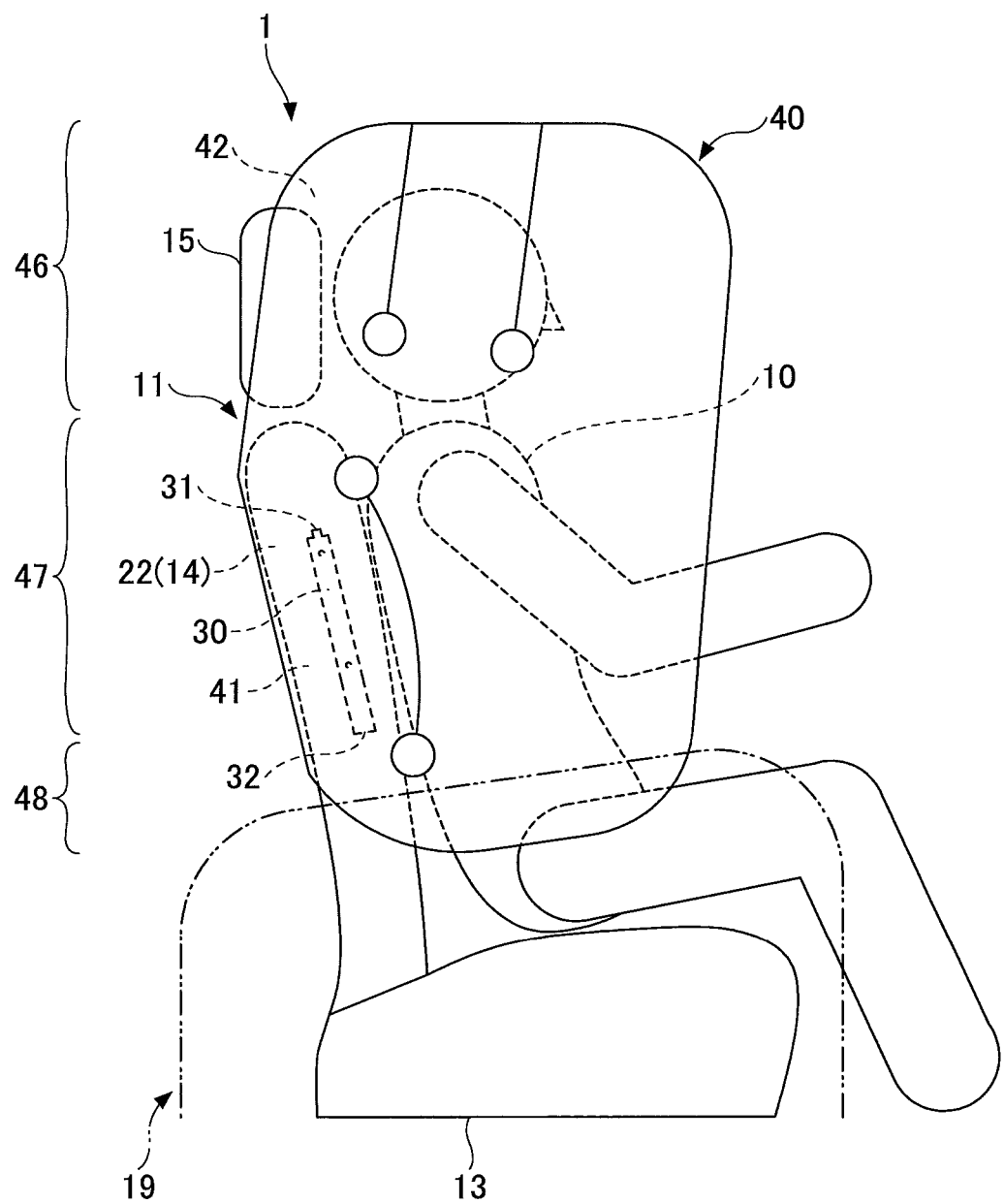
FIG. 2 is a side view where an air bag stored in an inner side of a backrest in a vehicle width direction is inflated and expanded.

FIG. 2 is a side view seen from one side in the vehicle width direction W where the air bag 40 is inflated and expanded. The air-bag device 1 includes the air bag 40 and an inflator 30.

The air bag 40 is an example of an air bag stored in the inner side 22 of the backrest 14. The air bag 40 is formed to have a substantially-rectangular shape that stands in a substantially-vertical direction when inflated. When inflated and expanded, the air bag 40 includes an upper inflation part 46 that supports the head of the passenger 10, a middle inflation part 47 that supports the chest of the passenger 10, and a lower inflation part 48 that supports the abdomen of the passenger 10. For example, the upper inflation part 46 and the middle inflation part 47 are inflated and expanded toward a space above the center console 19, and the lower inflation part 48 is inflated and expanded toward a space between a side surface of the center console 19 and the abdomen of the passenger 10.

The inflator 30 is an example of an inflator that inflates and expands the air bag 40. The inflator 30 is, for example, a gas supply source (or a gas generator) that supplies a gas to the air bag 40 and thereby inflates and expands the air bag 40. The inflator 30 has a substantially-cylindrical shape and is stored in the inner side 22 of the backrest 14 such that the longitudinal direction of the inflator 30 matches the longitudinal direction of the backrest 14.

The inflator 30 includes a protruding upper end 31 disposed in an upper part of the backrest 14 and a lower end 32 disposed in a lower part of the backrest 14. The inflator 30 ejects a gas for inflating and expanding the air bag 40 from an ejection hole formed in the upper end 31. When the gas is ejected from the inflator 30, the air bag 40 is inflated, pops out of the inner side 22, and expands in a space between a side surface of the center console 19 and the abdomen of the passenger 10 and a space above the center console 19.

When the air bag 40 is in a non-inflated state, i.e., before being inflated and expanded, the air-bag device 1 is stored in the inner side 22 with the air bag 40 folded.

Figure 3:
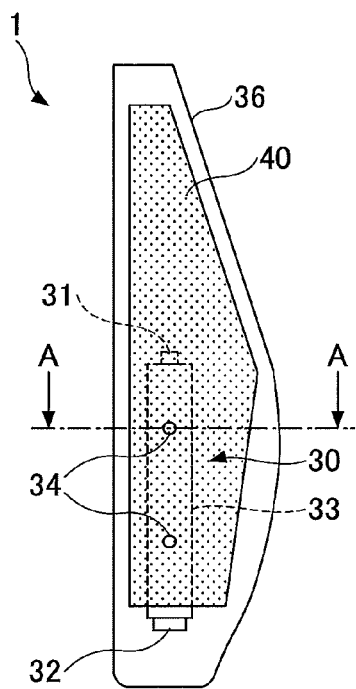
FIG. 3 is a schematic diagram of an exemplary air-bag device where an air bag is in a non-inflated state.
Figure 4:
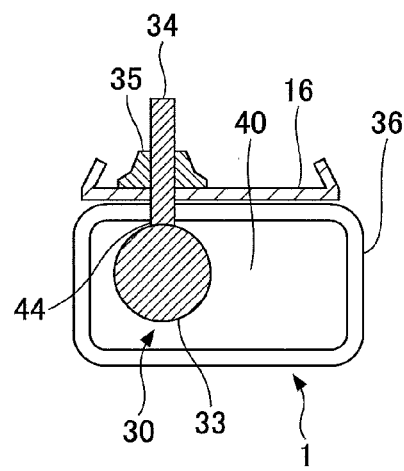
FIG. 4 is a cross-sectional view of an air-bag device taken along line A-A of FIG. 3.

FIG. 3 is a schematic diagram of the air-bag device 1 where the air bag 40 is in the non-inflated state. FIG. 4 is a cross-sectional view of the air-bag device 1 taken along line A-A of FIG. 3. As illustrated in FIGS. 3 and 4, the inflator 30 includes a cylindrical body 33 and two mounting legs 34 protruding from a side surface of the body 33. The mounting legs 34 are bolts on which screw threads are formed. To prevent the folded air bag 40 from being crumpled and cut, the air-bag device 1 may be covered by a cover 36. The cover 36 may be made of, for example, a nonwoven fabric or a resin case that can split open (or cleavable) as the air bag 40 is inflated. In FIG. 3, for illustration purposes, the shape of the folded air bag 40 is simplified.

The mounting legs 34 of the inflator 30 are inserted into mounting holes 44 formed in the air bag 40 and then inserted into frame holes formed in a seat frame 16 in the backrest 14. Then, nuts 35 are screwed onto the mounting legs 34 to fix the air-bag device 1 to the seat frame 16.

Figure 5:
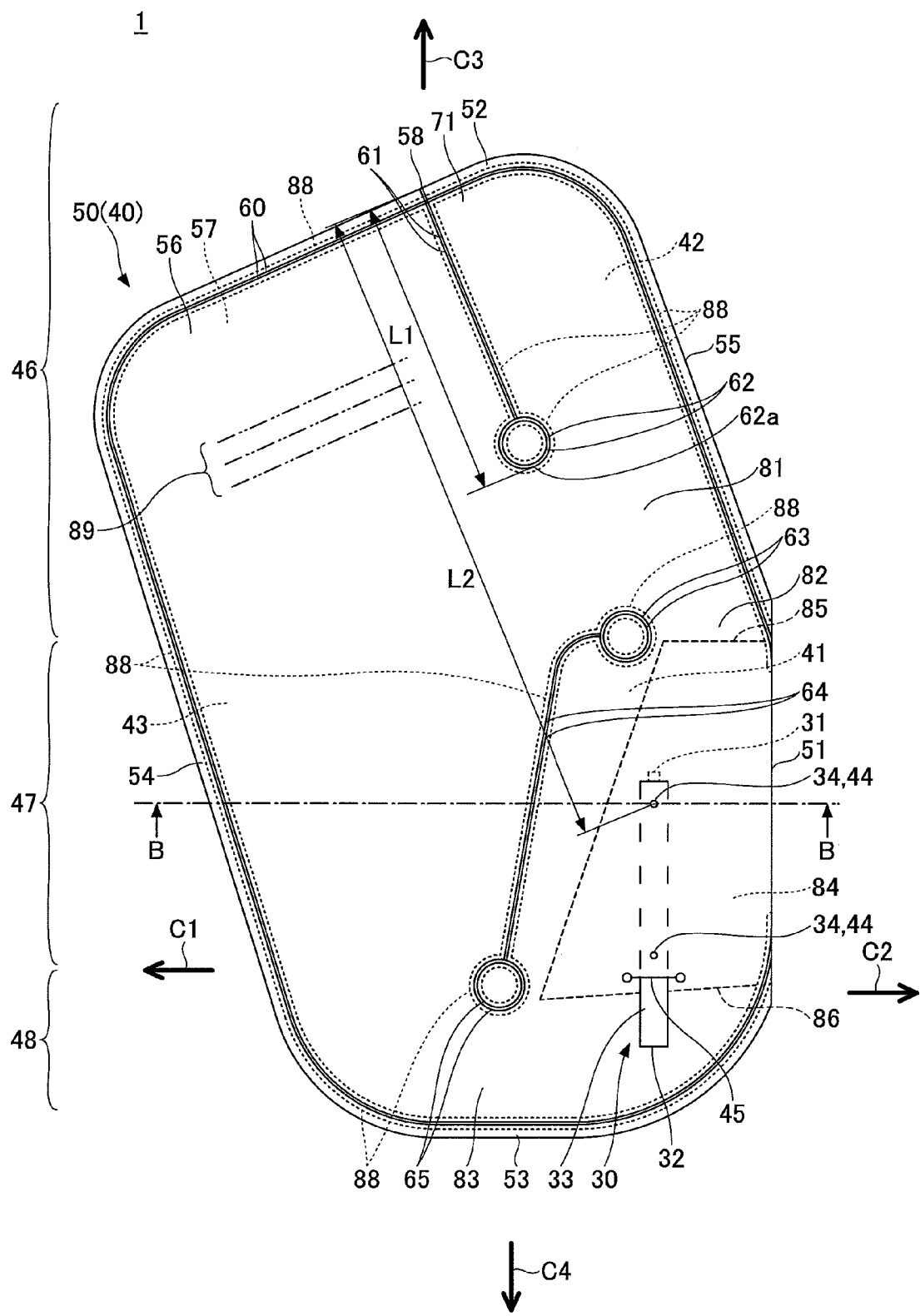
FIG. 5 is a side view of an exemplary air-bag device where an air bag is in a non-folded state before being folded.

FIG. 5 is a side view of the air-bag device 1 where the air bag 40 is in a non-folded state before being folded. In FIG. 5, arrows C1, C2, C3, and C4 indicate directions in which the air bag 40 stored in the backrest 14 is inflated and expanded. Specifically, the arrows C1, C2, C3, and C4 indicate, respectively, directions toward a front side, a rear side, an upper side, and a lower side of the vehicle 20.

The air bag 40 is a passenger protection component that is shaped like a bag and configured to be inflated and expanded toward a side surface of and a space above the center console 19 by a gas supplied from the upper end 31 of the inflator 30.

When seen from the vehicle width direction W, the air bag 40, for example, includes an upper edge 52, a lower edge 53, a front edge 54, and a rear edge 55, and has a substantially-rectangular shape. The direction toward the upper edge 52 or the lower edge 53 is the longitudinal direction of the air bag 40.

For example, the air bag 40 is formed into a bag shape by folding a single panel 50 along a folding line 51 and by joining (e.g., stitching) parts of outer edges of a pair of layered panel sheets 56 and 57 of the folded panel 50 at a linear double junction 60 (which is formed, for example, by two rows of stitches). In the example of FIG. 5, the parts of the outer edges indicate the outer edges of the panel sheets 56 and 57 excluding those corresponding to the folding line 51. The panel 50 is one sheet of base fabric.

The air bag 40 may also be formed into a bag shape by layering two or more panels and by joining (e.g., stitching) the outer edges of the layered panels.

The air bag 40 includes a chamber 41. The chamber 41 is an example of a first chamber that houses the inflator 30 such that the longitudinal direction of the inflator 30 matches the vertical direction of the air bag 40. The chamber 41 is an inflation chamber that is a lower, vehicle-rear side part of the air bag 40 and is inflated when the air bag 40 pops out of the backrest 14 and expands.

The air bag 40 also includes a chamber 42. The chamber 42 is an example of a second chamber that is inflated and expanded above the chamber 41 by the gas that is ejected from the upper end 31 of the inflator 30 and flows into a space above the chamber 41. When inflated and expanded, the chamber 42 forms a tubular shape that extends upward above the chamber 41. The chamber 42 is an inflation chamber that is an upper, vehicle-rear side part of the air bag 40 and is inflated when the air bag 40 pops out of the backrest 14 and expands. The chamber 42 is located above the chamber 41 and extends in the longitudinal direction of the air bag 40.

Thus, the air bag 40 includes the chamber 40 that houses the inflator 30 such that the longitudinal direction of the inflator 30 matches the vertical direction of the air bag 40, and the chamber 42 that is located above the chamber 41 and is inflated and expanded by the gas ejected from the upper end 31 of the inflator 30 to form a tubular shape extending upward above the chamber 41. For example, compared with a case where the gas is ejected from the lower end 32 of the inflator 30, ejecting the gas from the upper end 31 of the inflator 30 makes it easier to increase the internal pressure of the chamber 42 and enables the inflated and expanded chamber 42 to stably support itself. This configuration makes it possible to prevent the inflated and expanded air bag 40 from collapsing (or bending) toward an impact side even when pressed by the upper body of a passenger toward the impact side.

Also, because the chamber 42 is positioned in the upper inflation part 46 to be in contact with the head of the passenger 10, enabling the chamber 42 to stably support itself makes it possible to stabilize the expanded shape and the expansion behavior of the upper inflation part 46 including the chamber 42.

On the other hand, the chamber 41 is in the middle inflation part 47 to be in contact with the chest of the passenger 10 and in the lower inflation part 48 to be in contact with the abdomen of the passenger 10. Also, the chamber 41 is fixed, together with the inflator 30, to the seat frame 16 (see FIG. 4) in the backrest 14 via the mounting holes 44 formed in an area of the panel sheet 56 corresponding to the chamber 41. With this configuration, although the middle inflation part 47 is expanded into a space above the center console 19 where no support is provided, the expanded shape and the expansion behavior of the middle inflation part 47 are stabilized by the fixed chamber 41 partially included in the middle inflation part 47. The lower inflation part 48 is expanded into a space between a side surface of the center console 19 and the abdomen of the passenger 10. Because the lower inflation part 48 partially includes the fixed chamber 41 in addition to being supported by the side surface of the center console 19, the expanded shape and the expansion behavior of the lower inflation part 48 are further stabilized.

As illustrated in FIG. 5, the chamber 42 dead-ends (or is closed) at a top 71. This configuration makes it possible to retain the gas that has flown into the chamber 42, makes it easier to increase the internal pressure of the chamber 42, and thereby enables the inflated and expanded chamber 42 to stably support itself. Also, because the chamber 42 dead-ends at the top 71, the chamber 42 can stably expand into a tubular shape. The above configuration makes it possible to more effectively prevent the inflated and expanded air bag 40 from collapsing (or bending) toward an impact side even when pressed by the upper body of a passenger toward the impact side. In the example of FIG. 5, the top 71 is located at the upper edge 52 of the air bag 40, and the chamber 42 dead-ends at the upper edge 52.

The chamber 42 is a cell formed by partitioning the upper inflation part 46 of the air bag 40 along the longitudinal direction of the air bag 40. In the example of FIG. 5, the chamber 42 is formed by a junction 61, which partitions the internal space of the air bag 40 along the longitudinal direction of the air bag 40, between the junction 61 and the rear edge 55. The chamber 42 is disposed between the front edge 54 and the rear edge 55 and closer to the rear edge 55. Forming the chamber 42 by partitioning the internal space of the air bag 40 along the longitudinal direction of the air bag 40 makes it possible to increase the rigidity of the chamber 42, and makes it possible to stabilize the expansion behavior of the chamber 42 that expands into a tubular shape extending in the longitudinal direction of the air bag 40.

The junction 61 is an example of a partition that linearly partitions the internal space of the air bag 40 along the longitudinal direction of the air bag 40. The junction 61 is formed to linearly extend from a start point 58 at the upper edge 52 of the air bag 40. Forming the junction 61 to extend from the upper edge 52 makes it possible to make the length of the cylindrical chamber 42 as long as possible within the limited dimensions of the air bag 40, and thereby makes it possible to maximize the area of the chamber 42 that supports the head of the passenger 10.

The junction 61 is an example of a junction that joins the layered panel sheets 56 and 57. The panel sheets 56 and 57 of the panel 50 are joined, for example, by stitching at the linear double junction 61 (which is formed, for example, by two rows of stitches).

The junction 61 includes a part that is parallel to the rear edge 55 of the air bag 40. This configuration further stabilizes the expanded shape of the chamber 42 that expands into a tubular shape. In the example of FIG. 5, the entire junction 61 is parallel to the rear edge 55.

The chamber 42 is inflated and expanded into a tubular shape that is inclined toward the front edge 54 with respect to the longitudinal direction of the inflator 30. This configuration makes it possible to increase an area of the chamber 42 for supporting the head of the passenger 10 (see FIG. 2). For example, as illustrated in FIG. 5, the chamber 42 is inclined toward the front edge 54 such that the rear edge 55 intersects with an extension of the longitudinal axis of the inflator 30.

In FIG. 5, a junction 62 is an end point of the junction 61 extending from the start point 58, and joins the layered panel sheets 56 and 57. The panel sheets 56 and 57 of the panel 50 are joined, for example, by stitching at the circular double junction 62 (which is formed, for example, by two rows of stitches).

To stabilize the expanded shape of the chamber 42 that expands into a tubular shape, a linear distance L1 between the start point 58 and a lowest point 62*a* of the junction 62 is preferably greater than or equal to one third ($\frac{1}{3}$) and less than or equal to one half ($\frac{1}{2}$) of a linear distance L2 between the start point 58 and the center of one of the mounting holes 44 closer to the upper end 31 of the inflator 30. When the distance L1 is less than one third of the distance L2, the effect of preventing the collapse of the chamber 42 is reduced. When the distance L1 is greater than one half of the distance L2, a flow path 81 becomes too narrow.

The air bag 40 also includes a chamber 43 and the flow path 81. The chamber 43 is an example of a third chamber that is inflated and expanded at a position lateral to the chamber 42. The flow path 81 is an example of a flow path that allows the gas ejected by the upper end 31 of the inflator 30 to flow from the chamber 42 into the chamber 43. With the flow path 81, the gas ejected from the upper end 31 of the inflator 30 flows via the chamber 42 into the chamber 43. This configuration makes it possible to reduce the time necessary to fully expand the chamber 43 after the gas is ejected from the inflator 30.

The chamber 43 is an inflation chamber that is a vehicle-front side part of the air bag 40 and is inflated when the air bag 40 pops out of the backrest 14 and expands. The chamber 43 is located lateral to the chambers 41 and 42 and closer to the front edge 54 than the chambers 41 and 42, and extends in the longitudinal direction of the air bag 40.

The flow path 81 is located, for example, between the junction 62 at the lower end of the junction 61 and a junction 63 at the upper end of a junction 64. The junction 61 is a partition between the chamber 42 and the chamber 43, and the junction 64 is a partition between the chamber 41 and the chamber 43.

The junction 64 joins the layered panel sheets and 57. The junction 63 is the upper end of the junction 64, and a junction 65 is the lower end of the junction 64. The panel sheets 56 and 57 of the panel 50 are joined, for example, by stitching at the linear double junction 64 (which is formed, for example, by two rows of stitches), and are also joined, for example, by stitching at the circular double junctions 63 and 65 (each of which is formed, for example, by two rows of stitches).

The junction 64 makes it possible to limit the amount of gas flowing from the chamber 41 into the chamber 43, and thereby makes it possible to increase the amount of gas flowing from the chamber 41 via a flow path 82 into the chamber 42. This in turn makes it possible to increase the internal pressure of the chamber 42, and thereby makes it possible to prevent the chamber 42 and the air bag 40 from collapsing.

The flow path 82 is an example of a flow path that allows a gas to flow from the chamber 41 into the chamber 42. For example, the flow path 82 is a space provided between the junction 63 and the rear edge 55. A flow path 83 is an example of a flow path that allows a gas to flow from the chamber 41 into the chamber 43. For example, the flow path 83 is a space provided between the junction 65 and the lower edge 53. A flow path for allowing a gas to flow from the chamber 41 into the chamber 43 may also be formed in the junction 64.

The upper inflation part 46 in the chamber 43 may also be partitioned along the longitudinal direction of the air bag 40 by a junction similar to the junctions 61 and 62 illustrated in FIG. 5. FIG. 2 illustrates an example where the upper inflation part 46 is partitioned by two junctions.

The air bag 40 may be accordion-folded in the longitudinal direction of the air bag 40. Compared with a case where the air bag 40 is rolled in the longitudinal direction of the air bag 40, accordion-folding the air bag 40 makes it possible to reduce the time necessary to expand the air bag 40. In FIG. 5, reference number 89 indicates some of creases (or folding lines) of accordion folding. The air bag 40 is accordion-folded in the longitudinal direction of the air bag 40 such that the creases 89 become orthogonal to the longitudinal direction of the air bag 40

For example, the air bag 40 is accordion-folded from the upper edge 52 up to the position of the inflator 30 in the longitudinal direction of the air bag 40 after the chamber 42 is folded back at the junction such that the panel sheet 56 faces outward (or the panel sheet 56 is mountain-folded). Folding the air bag 40 in this manner makes it possible to reduce the time necessary to expand the air bag 40. To enable the chamber 42 to be folded back at the junction 61 such that the panel sheet 56 is mountain-folded, the upper end 31 of the inflator 30 is positioned closer to the lower edge 53 relative to an extension of the junction 61.

The air bag 40 may also include a diffuser 84 in the chamber 41. The diffuser 84 is an example of a regulator that controls the flow rates of the gas distributed from the chamber 41 to the chamber 42 and the chamber 43. For example, similarly to the panel 50, the diffuser 84 may be made of a base fabric. The diffuser 84 is disposed in the chamber 41 and rolled into a tapered tubular shape having an opening 85 facing the upper edge 52 and an opening 86 facing the lower edge 53.

When the area of the opening 85 is less than the area of the opening 86, the diffuser 84 limits the flow rate of the gas flowing from the chamber 41 via the flow path 82 into the chamber 42, and increases the flow rate of the gas flowing from the chamber 41 via the flow path 83 into the chamber 43.

The inflator 30 is inserted from the upper end 31 into an insertion slit 45 formed in a part of the panel sheet 56 corresponding to the chamber 41, and is thereby placed in the chamber 41. The lower end 32 may be exposed through the insertion slit 45. When the diffuser 84 is provided in the chamber 41, the insertion slit 45 is also formed in a surface of the diffuser 84, and the inflator 30 is placed in the diffuser 84.

Each of the junctions 60 through 65 may be a seam (or a suture) formed by stitching the panel sheets and 57 together with threads. A sealant 88 may be applied to the seam. The sealant 88 prevents the gas from leaking through gaps around the threads and thereby makes it possible to keep the internal pressure and improve the airtightness of the chambers 41, 42, and 43. The sealant 88 is a solvent for sealing the junctions 60 through 65. All or some of the junctions 60 through 65 may be sealed by the sealant 88.

Figure 6:
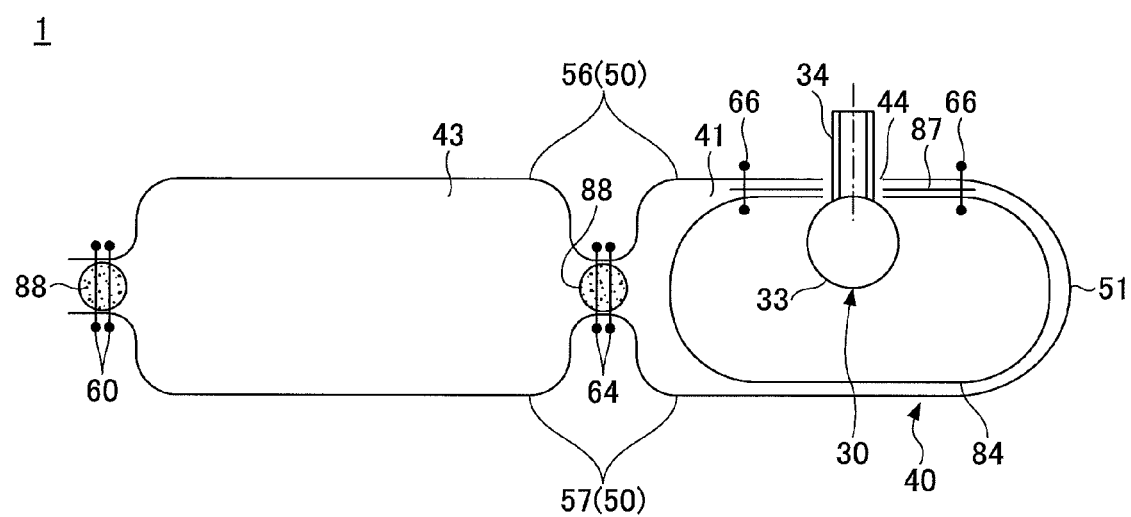
FIG. 6 is a cross-sectional view of an air-bag device taken along line B-B of FIG. 5.

FIG. 6 is a cross-sectional view of the air-bag device 1 taken along line B-B of FIG. 5. FIG. 6 illustrates the junctions 60 and 64 that are stitched (or sutured) with threads and sealed by the sealant 88. In the example of FIG. 6, the inflator 30 is disposed in the diffuser 84. The diffuser 84 is joined, together with a reinforcing cloth 87, to the panel sheet 56 at a junction 66 stitched with threads. The reinforcing cloth 87 is placed between the diffuser 84 and the panel sheet 56 to strengthen an area of the panel sheet 56 around the mounting holes 44 to which the inflator 30 is attached.

Figure 7:
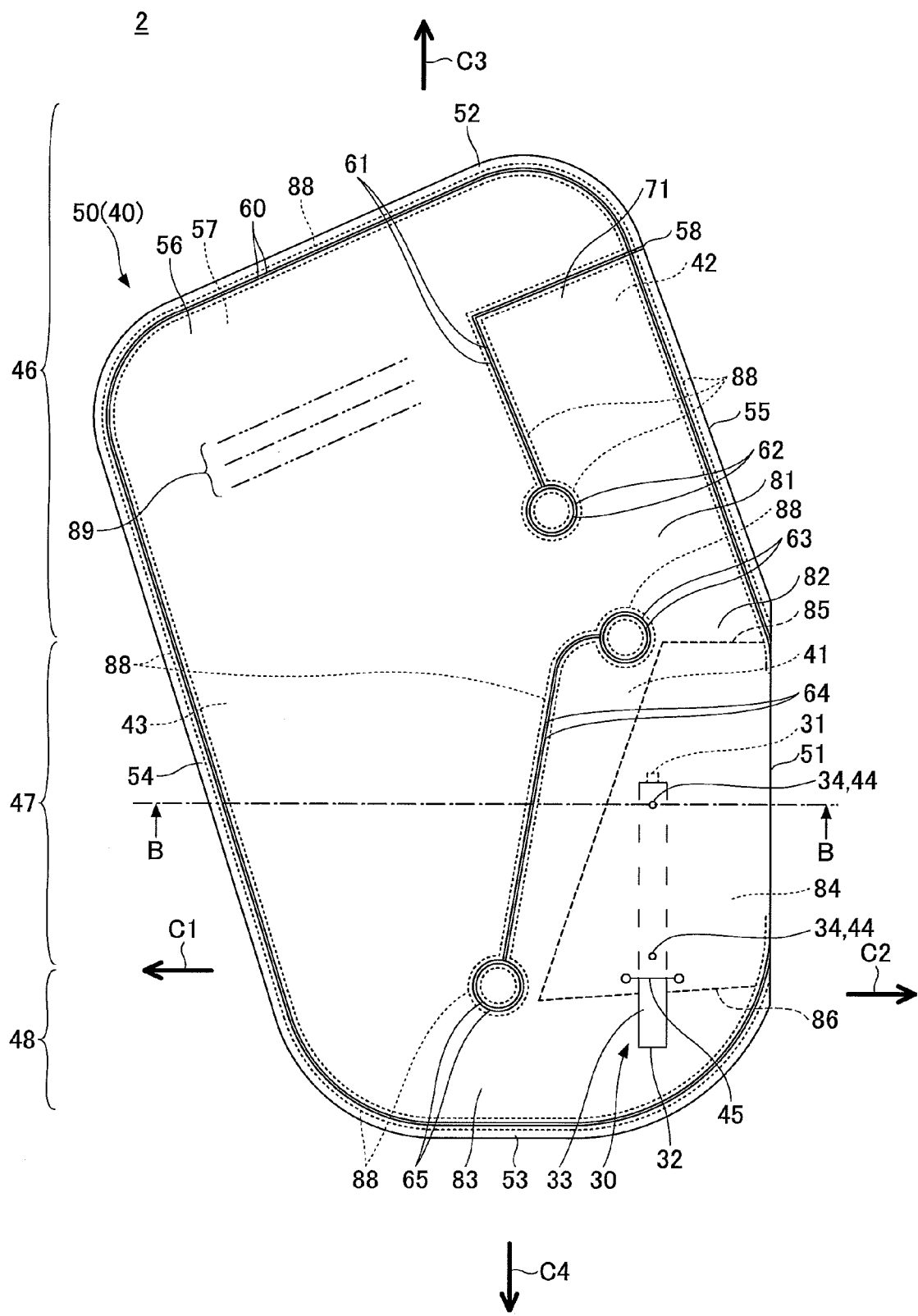
FIG. 7 is a side view of an exemplary air-bag device where an air bag is in a non-folded state before being folded.

FIG. 7 is a side view of an air-bag device 2 where the air bag 40 is in a non-folded state before being folded. Here, descriptions of components and effects of the air-bag device 2 similar to those of the air-bag device 1 are omitted. The air-bag device 2 is different from the air-bag device 1 illustrated by FIG. in that the junction 61 has an L-shape and extends from a start point 58 at the rear edge 55 to the junction 62. Also different from the configuration of FIG. 5, the top 71 of the chamber 42 is not located at the upper edge 52. Instead, a part of the space of the chamber 43 is present between the top 71 and the upper edge 52.

Air-bag devices according to embodiments are described above. However, the present invention is not limited to the above described embodiments. Combinations of some or all of the embodiments and variations and modifications of the embodiments may be made without departing from the scope of the present invention.

For example, instead of a backrest of a front seat, an air bag (or an air-bag device) may be stored in a backrest of a back seat.

Also, a junction for partitioning the internal space of an air bag along the longitudinal direction of the air bag does not necessarily have a linear shape. For example, a junction may include a linear part and a curved part.

The method of joining panel sheets at a junction is not limited to stitching. For example, panel sheets may be joined by bonding or welding. Also, panel sheets facing each other may be joined at a junction using a tether. Further, depending on an internal pressure required for an air bag, a junction may be formed by a single row of stitches or three or more rows of stitches.

An aspect of this disclosure provides an air-bag device that includes an air bag that is stored in an inner side of a backrest in the vehicle width direction and does not easily collapse (or bend) when the air bag is inflated and expanded.

In an air-bag device according to an embodiment, an upper end of an inflator in a first chamber is disposed at a position relatively close to a second chamber. This configuration makes it possible to smoothly increase the internal pressure of the second chamber, and thereby makes it possible to prevent an air bag stored in an inner side of a backrest in the vehicle 3G width direction from collapsing (or bending) after being inflated and expanded.

What is claimed is:
1. An air-bag device, comprising:
an air bag stored in an inner side of a backrest in a vehicle width direction; and
an inflator that inflates and expands the air bag, wherein the air bag includes
  a first chamber that houses the inflator such that a longitudinal direction of the inflator matches a vertical direction of the air bag,
  a second chamber that is located above the first chamber and is inflated and expanded by a gas ejected from an upper end of the inflator to form a tubular shape extending upward above the first chamber, and
  a third chamber that is inflated and expanded at a position lateral to the second chamber;
the first chamber is separated from the third chamber by a first partition, and the second chamber is separated from the third chamber by a second partition that extends from an upper edge of the air bag along a longitudinal direction of the air bag;

a first flow path that allows the gas to flow from the second chamber into the third chamber is formed between an upper end of the first partition and a lower end of the second partition; and a second flow path that allows the gas to flow from the first chamber into the third chamber is formed between a lower end of the first partition and a lower edge of the air bag.

2. The air-bag device as claimed in claim 1, wherein the second chamber dead-ends at a top of the second chamber.

3. The air-bag device as claimed in claim 1, wherein the second partition includes a part that is parallel to a rear edge of the air bag.

4. The air-bag device as claimed in claim 1, wherein the second chamber is inflated and expanded into the tubular shape that is inclined with respect to the longitudinal direction of the inflator.

5. The air-bag device as claimed in claim 1, wherein the air bag further includes a regulator that controls flow rates of the gas distributed from the first chamber to the second chamber and the third chamber.

6. The air-bag device as claimed in claim 1, wherein each of the first partition and the second partition is a junction that joins a pair of panel sheets of the air bag.

7. The air-bag device as claimed in claim 6, wherein the junction is a seam to which a sealant is applied.

8. The air-bag device as claimed in claim 1, wherein the air bag is accordion-folded in a longitudinal direction of the air bag.

9. The air-bag device as claimed in claim 8, wherein the air bag is accordion-folded in the longitudinal direction of the air bag after the second chamber is folded back.

\* \* \* \* \*